(12) United States Patent
Oki

(10) Patent No.: US 9,052,477 B2
(45) Date of Patent: Jun. 9, 2015

(54) OPTICAL TRANSCEIVER WITH INNER FIBER SET WITHIN TRAY SECURING THERMAL PATH FROM ELECTRONIC DEVICE TO HOUSING

(75) Inventor: Kazushige Oki, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 215 days.

(21) Appl. No.: 13/486,723

(22) Filed: Jun. 1, 2012

(65) Prior Publication Data

US 2012/0237171 A1 Sep. 20, 2012

Related U.S. Application Data

(63) Continuation-in-part of application No. 12/916,080, filed on Oct. 29, 2010, now Pat. No. 8,376,634.

(60) Provisional application No. 61/261,105, filed on Nov. 13, 2009, provisional application No. 61/314,801, filed on Mar. 17, 2010.

(30) Foreign Application Priority Data

| Oct. 29, 2009 | (JP) | ................................. 2009-248592 |
| May 31, 2010 | (JP) | ................................. 2010-083610 |
| Apr. 30, 2010 | (JP) | ................................. 2010-105557 |
| Apr. 30, 2010 | (JP) | ................................. 2010-105560 |
| May 18, 2010 | (JP) | ................................. 2010-114311 |
| Sep. 24, 2010 | (JP) | ................................. 2010-213701 |
| Jun. 2, 2011 | (JP) | ................................. 2011-124232 |

(51) Int. Cl.
G02B 6/42 (2006.01)
G02B 6/38 (2006.01)

(52) U.S. Cl.
CPC ............ *G02B 6/4201* (2013.01); *G02B 6/3821* (2013.01); *G02B 6/3825* (2013.01); *G02B 6/3878* (2013.01); *G02B 6/3897* (2013.01);
(Continued)

(58) Field of Classification Search
None
See application file for complete search history.

(56) References Cited

U.S. PATENT DOCUMENTS

| 4,798,440 A | 1/1989 | Hoffer et al. |
| 4,861,134 A | 8/1989 | Alameel et al. |

(Continued)

FOREIGN PATENT DOCUMENTS

| CN | 1335691 A | 2/2002 |
| CN | 1423143 A | 6/2003 |

(Continued)

OTHER PUBLICATIONS

CFP Multi-Source Agreement (MSA) Hardware Specification Revision 1.4, pp. 1-53, Jun. 7, 2010.
(Continued)

*Primary Examiner* — Mike Stahl
(74) *Attorney, Agent, or Firm* — Venable LLP; Michael A. Sartori; Tamatane J. Aga

(57) ABSTRACT

An optical transceiver with inner fibers to couple optical parts installed therein is disclosed. The optical transceiver of an embodiment includes a tray for arranging the inner fibers. The tray, which may be made of metal plate, includes a primary plane in contact with the electronic parts, the contact plane in contact with the housing, and the turn connecting the planes. The tray has a U-shaped cross section with a space surrounded by both planes, the turn, and the housing, where the inner fibers are secured in the space.

14 Claims, 13 Drawing Sheets

(52) U.S. Cl.
CPC .............. *G02B 6/421* (2013.01); *G02B 6/4246* (2013.01); *G02B 6/4292* (2013.01)

(56) References Cited

U.S. PATENT DOCUMENTS

| | | |
|---|---|---|
| 5,037,175 A | 8/1991 | Weber |
| 5,231,685 A | 7/1993 | Hanzawa et al. |
| 5,337,396 A | 8/1994 | Chen et al. |
| 5,347,605 A | 9/1994 | Isaksson |
| 5,757,998 A | 5/1998 | Thatcher et al. |
| 5,956,449 A | 9/1999 | Otani et al. |
| 6,058,235 A | 5/2000 | Hiramatsu et al. |
| 6,085,006 A | 7/2000 | Gaio et al. |
| 6,130,444 A * | 10/2000 | Hashizume et al. ............ 257/81 |
| 6,164,838 A | 12/2000 | Maehara et al. |
| 6,239,427 B1 | 5/2001 | Mizue |
| 6,494,623 B1 | 12/2002 | Ahrens et al. |
| 6,644,866 B1 | 11/2003 | Kusuda et al. |
| 6,804,431 B2 | 10/2004 | Kowalkowski et al. |
| 6,811,326 B2 | 11/2004 | Keeble et al. |
| 6,873,800 B1 | 3/2005 | Wei et al. |
| 6,876,809 B1 | 4/2005 | Sonderegger et al. |
| 6,923,580 B2 | 8/2005 | Ohno et al. |
| 7,094,091 B2 | 8/2006 | Grzegorzewska et al. |
| 7,156,562 B2 | 1/2007 | Mazotti et al. |
| 7,210,855 B2 | 5/2007 | Rossi et al. |
| 7,343,078 B2 | 3/2008 | Spisany et al. |
| 7,364,446 B2 | 4/2008 | Kurashima |
| 8,104,977 B2 | 1/2012 | Sone et al. |
| 8,376,634 B2 * | 2/2013 | Oki et al. .................... 385/92 |
| 8,496,385 B2 * | 7/2013 | Richardson et al. ............ 385/77 |
| 2002/0031312 A1 | 3/2002 | Iwamoto |
| 2002/0131122 A1 | 9/2002 | Anderl et al. |
| 2002/0181900 A1 | 12/2002 | Loch et al. |
| 2003/0044129 A1 | 3/2003 | Ahrens et al. |
| 2003/0048999 A1 | 3/2003 | Imabayashi et al. |
| 2003/0095780 A1 | 5/2003 | Chang |
| 2003/0171022 A1 | 9/2003 | Distad et al. |
| 2003/0185525 A1 | 10/2003 | Lacy et al. |
| 2003/0236019 A1 | 12/2003 | Hanley et al. |
| 2004/0062493 A1 | 4/2004 | Ishigami et al. |
| 2004/0081418 A1 | 4/2004 | Kurashima et al. |
| 2004/0086240 A1 | 5/2004 | Togami et al. |
| 2004/0184745 A1 | 9/2004 | Mynatt et al. |
| 2004/0208459 A1 | 10/2004 | Mizue et al. |
| 2005/0036746 A1 | 2/2005 | Scheibenreif et al. |
| 2005/0168957 A1 | 8/2005 | Kawauchi et al. |
| 2005/0213871 A1 | 9/2005 | Schwiebert et al. |
| 2006/0093287 A1 | 5/2006 | Yoshikawa et al. |
| 2006/0115219 A1 | 6/2006 | Mudd et al. |
| 2006/0133744 A1 | 6/2006 | Diaz |
| 2006/0140554 A1 | 6/2006 | Oki |
| 2006/0215970 A1 | 9/2006 | Mizue et al. |
| 2006/0245759 A1 | 11/2006 | Kurashima |
| 2006/0257081 A1 | 11/2006 | Ishigami et al. |
| 2007/0041687 A1 | 2/2007 | Mizue et al. |
| 2007/0058911 A1 | 3/2007 | Yu et al. |
| 2008/0062980 A1 | 3/2008 | Sunaga et al. |
| 2008/0095541 A1 | 4/2008 | Dallesasse |
| 2008/0205827 A1 | 8/2008 | Moore et al. |
| 2009/0010600 A1 | 1/2009 | Kim et al. |
| 2009/0016685 A1 | 1/2009 | Hudgins et al. |
| 2009/0032291 A1 | 2/2009 | Moore et al. |
| 2009/0052898 A1 | 2/2009 | Oki et al. |
| 2010/0158465 A1 | 6/2010 | Smrha |
| 2010/0195961 A1 | 8/2010 | Yoshikawa |
| 2010/0261378 A1 | 10/2010 | Davison et al. |
| 2011/0103797 A1 | 5/2011 | Oki et al. |
| 2012/0189254 A1 | 7/2012 | Wang et al. |
| 2012/0224814 A1 * | 9/2012 | Hirano et al. .................... 385/49 |
| 2012/0269486 A1 | 10/2012 | Ishii |
| 2013/0039660 A1 | 2/2013 | Ho et al. |
| 2013/0336617 A1 | 12/2013 | Otte et al. |

FOREIGN PATENT DOCUMENTS

| | | |
|---|---|---|
| CN | 1450729 A | 10/2003 |
| CN | 1629671 A | 6/2005 |
| CN | 1651953 A | 8/2005 |
| CN | 2768324 Y | 3/2006 |
| CN | 2911708 Y | 6/2007 |
| CN | 101278220 A | 10/2008 |
| CN | 101403812 A | 4/2009 |
| CN | 101527377 A | 9/2009 |
| CN | 201503510 U | 6/2010 |
| CN | 102687049 A | 9/2012 |
| JP | H-02-46410 A | 2/1990 |
| JP | 03-103411 A | 4/1991 |
| JP | 03-103411 U | 10/1991 |
| JP | 6-337317 A | 12/1994 |
| JP | 08-062454 A | 3/1996 |
| JP | 11-344644 A | 12/1999 |
| JP | 2000-206373 A | 7/2000 |
| JP | 2001-168573 A | 6/2001 |
| JP | 2001/244672 A | 9/2001 |
| JP | 2002-277693 A | 9/2002 |
| JP | 2003-295001 A | 10/2003 |
| JP | 2004-103743 A | 4/2004 |
| JP | 2004-247700 A | 9/2004 |
| JP | 2004-273924 A | 9/2004 |
| JP | 2005-025093 A | 1/2005 |
| JP | 2005-099769 A | 4/2005 |
| JP | 2005-148629 A | 6/2005 |
| JP | 3113384 U | 9/2005 |
| JP | 2006-003902 A | 1/2006 |
| JP | 2006-184708 A | 7/2006 |
| JP | 2006-251833 A | 9/2006 |
| JP | 2007-078975 A | 3/2007 |
| JP | 2007-102112 A | 4/2007 |
| JP | 2007-166005 A | 6/2007 |
| JP | 2007-310233 A | 11/2007 |
| JP | 2007-316226 A | 12/2007 |
| JP | 2008-250360 A | 10/2008 |
| JP | 2009-251600 A | 10/2009 |
| JP | 2009-302130 A | 12/2009 |
| JP | 2010-002931 A | 1/2010 |
| JP | 2010-067731 A | 3/2010 |
| JP | 2010-072651 A | 4/2010 |
| JP | 2010-072652 A | 4/2010 |
| JP | 2010-133989 A | 6/2010 |
| JP | 2011-033644 A | 2/2011 |
| JP | 2011-118337 A | 6/2011 |

OTHER PUBLICATIONS

Office Action in Chinese Patent Application No. 201210313886.6, dated Feb. 26, 2014.
Notice of Allowance in Japanese Patent Application No. 2010-105557, dated Jan. 7, 2014.
Notice of Allowance in Japanese Patent Application No. 2010-105560, dated Jan. 7, 2014.
Notice of Allowance in Japanese Patent Application No. 2010-114311, dated Jan. 7, 2014.
Office Action in Chinese Patent Application No. 201210313554.8, dated Dec. 23, 2013.
Office Action in Chinese Patent Application No. 201210313557.1, dated Jan. 21, 2014.
Office Action in Chinese Patent Application No. 201210313877.7, dated Jan. 20, 2014.
Office Action in U.S. Appl. No. 13/118,068, dated Feb. 10, 2014.
Office Action in U.S. Appl. No. 13/432,556, dated Feb. 27, 2014.
Office Action in U.S. Appl. No. 13/118,053, dated Jan. 8, 2014.
CFP Multi-Source Agreement (MSA) Draft 1.0, pp. 1-52, Mar. 23, 2009.
Office Action issued in Japanese Patent Application No. 2010-083610 dated Sep. 10, 2013.
Office Action in U.S. Appl. No. 13/118,101 dated Apr. 11, 2013.
Office Action in U.S. Appl. No. 13/118,096 dated Apr. 25, 2013.
Office Action in U.S. Appl. No. 13/118,078 dated May 9, 2013.

(56) References Cited

OTHER PUBLICATIONS

Office Action in Chinese Patent Application No. 201210179436.2, dated Aug. 15, 2014.
Notification of Reasons of Rejection in Japanese Patent Application No. 2010-213701, dated Sep. 2, 2014.
Notification of the First Office Action in Chinese Patent Application No. 201210101725.0, dated Nov. 26, 2014.
Japanese Notice of Reasons for Rejection issued in Application No. P2011-124232 dated Feb. 24, 2015.
Notice of Allowance in Japanese Patent Application No. 2010-213701 dated Mar. 24, 2015.

* cited by examiner

Fig. 6 *(prior art)*

OPTICAL TRANSCEIVER WITH INNER FIBER SET WITHIN TRAY SECURING THERMAL PATH FROM ELECTRONIC DEVICE TO HOUSING

RELATED APPLICATIONS

This application is a continuation-in-part application of and claims a benefit of priority from U.S. patent application Ser. No. 12/916,080, filed on Oct. 29, 2010, which is based on and claims a benefit of U.S. Provisional patent application Ser. No. 61/261,105 filed on Nov. 13, 2009, and Ser. No. 61/314,801 filed on Mar. 17, 2010, and which claims a benefit of priority to Japanese Patent Application No. 2009-248592, filed Oct. 29, 2009, Japanese Patent Application No. 2010-083610, filed Mar. 31, 2010, Japanese Patent Application No. 2010-105557, filed Apr. 30, 2010, Japanese Patent Application No. 2010-105560, filed Apr. 30, 2010, Japanese Patent Application No. 2010-114311, filed May 18, 2010, and Japanese Patent Application No. 2010-213701, filed Sep. 24, 2010. This application also claims a benefit of priority to Japanese Patent Application No. 2011-124232, filed Jun. 2, 2011. The entire contents of these applications are incorporated herein by reference.

BACKGROUND OF THE INVENTION

1. Field

An embodiment of the present invention relates to an apparatus for the optical communication.

2. Background

A multi-source agreement (MSA) accessible as "CFP MSA Hardware Specification Revision 1.4" in the internet, <http://www.cfp-msa.org>, has designed an optical transceiver implemented with an optical multiplexer/de-multiplexer and optical transmitter/receiver. The optical transceiver designed therein realizes the optical communication with the transmission capacity of 40 Gbit/s by multiplexing/de-multiplexing four optical signals each having the transmission speed of 10 Gbit/s; or an excellent transmission capacity of 100 Gbit/s by multiplexing/de-multiplexing four optical signals each having the speed of 25 Gbit/s.

Such an optical transceiver following the CFP-MSA above has two type of arrangements, one of which is called as the integrated type where the optical multiplexer and the optical de-multiplexer are integrated with the optical transmitter and the optical receiver; while, the other called as the discrete type divides the optical transmitter and the optical receiver from the optical multiplexer and the optical de-multiplexer. The integrated type may make the housing of the optical transceiver in compact because the discrete type needs a space to wire inner fibers coupling the optical multiplexer/de-multiplexer with the optical transmitter/receiver. On the other hand, the integrated type inherently has disadvantages in points that, when at least one of optical transmitter or the optical receiver falls into trouble, the whole components of the optical transmitter/receiver and the optical multiplexer/de-multiplexer are necessary to be replaced, which drastically increases the production cost of the optical transceiver. The discrete type may replace only one component falling into trouble.

The discrete type is necessary to set a plurality of inner fibers within the housing as securing the minimum bending curvature of the optical fiber. Moreover, each of the inner fibers accompanies therewith an optical connector to be mated with the optical multiplexer/de-multiplexer or the optical transmitter/receiver, and the process to assemble the inner fiber with the optical connector is necessary to estimate the process tolerance in a length of the processed inner fiber. Then, the housing of the optical transceiver is inevitable to be widened in the inner space thereof, and the space for distributing the inner fibers are, for instance, between the circuit board on which electronic components are mounted and the housing, in other words, the space under the circuit board.

Because the electronic components on the circuit board, in particular, the active electronic devices generally generate heat, the optical transceiver provides heat dissipating paths from the electronic components to the housing. Typical paths are thermal blocks put between the circuit board, in particular, portions of the circuit board where the active devices are mounted, and the housing. The inner fibers need to be distributed to escape from the thermal block, which inevitably results in the condition to reduce the process tolerance of the assembly of the inner fibers with the optical connector. Thus, both the integrated type and the discrete type have disadvantages peculiar to the respective types.

SUMMARY

One aspect of the present application relates to an optical transceiver that comprises an optical subassembly, an optical component, an electrical component, a tray, and a housing. The optical component may optically couple with the optical subassembly via an inner fiber. The electrical component generally generates heat as they are practically operated. The tray may guide the inner fiber. The housing may enclose the optical subassembly, the optical component, the electrical component, and the tray therein. A feature of the optical transceiver according to an embodiment of the invention is that the tray is in contact with the electronic component and the housing to secure a heat dissipating path from the electronic component to the housing.

Because the tray in the optical transceiver may provide functions not only to guide the inner fiber but to secure the heat dissipating path, the wiring of the inner fiber within the housing may be substantially independent of the position of the electronic component. That is, the position of the electronic component does not interfere with the wiring of the inner fiber. The tray may be in contact with both of the electronic component and the housing, or the tray may be in indirectly contact with the electronic component via a thermal sheet, or may fill a space, in which the inner fiber is guided, with a thermal gel. Both the thermal sheet and the thermal gel may enhance the heat dissipating function, or reduce the thermal resistance between the electronic component and the housing.

The arrangement of the optical transceiver according to an embodiment is particularly suitable for an optical transceiver that installs a plurality of optical subassemblies, a plurality of optical components such as an optical multiplexer or de-multiplexer, and a plurality of inner fibers each connecting the optical subassemblies with the optical components.

Because inner fibers are likely to be disordered within the housing, some members such as fiber tray to set the disordered inner fibers therein are inevitable. However, such members often interfere with physical functions of other components, for instance, a mechanism to dissipate heat from electronic circuits to an outside of the housing. The tray according to an embodiment of the present application may show a function to guide inner fiber and to conduct heat efficiently from the electronic circuit.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Next, some preferred embodiments of an optical transceiver according to the preset invention will be described as referring to accompanying drawings. In the description of the drawings, the numerals or symbols same or similar to each other will refer to the elements same or similar to each other without overlapping explanations.

Figure 1:
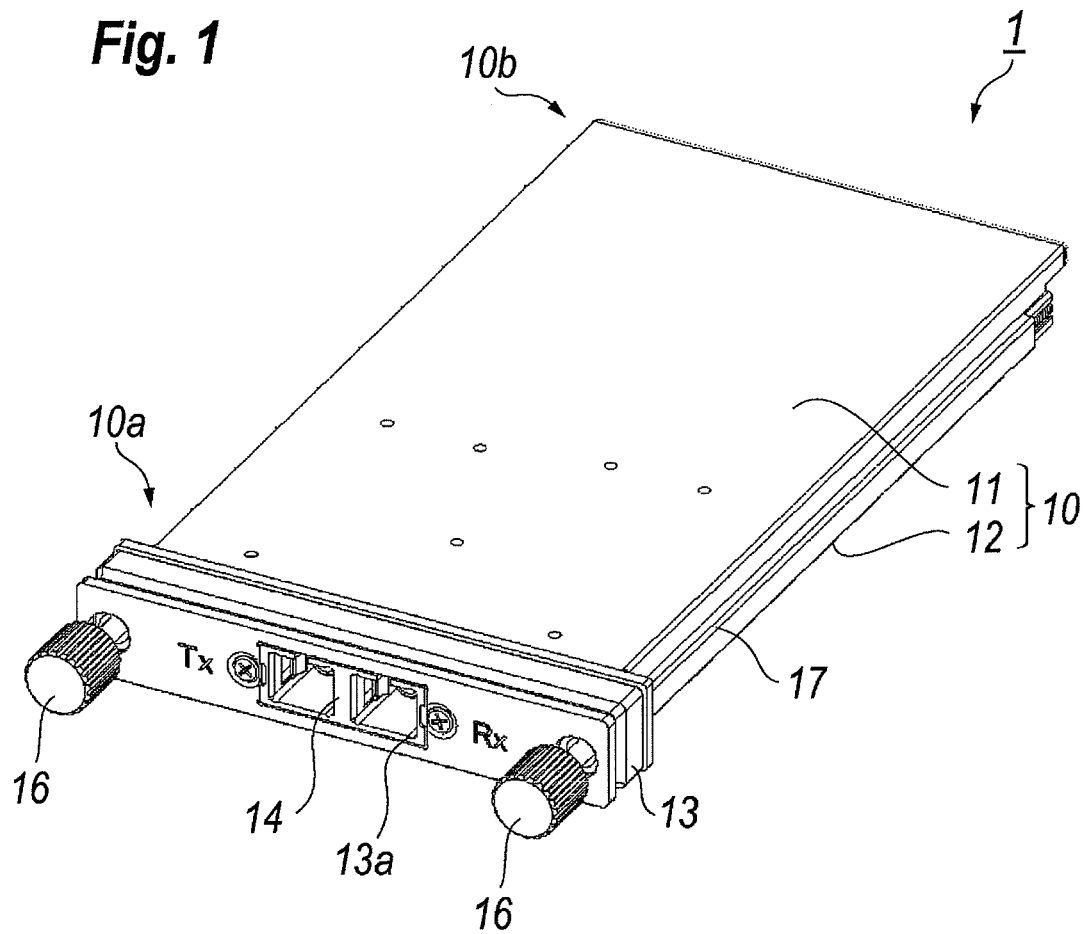
FIG. 1 is a perspective illustration of an optical transceiver viewed from the front top thereof.
Figure 2:
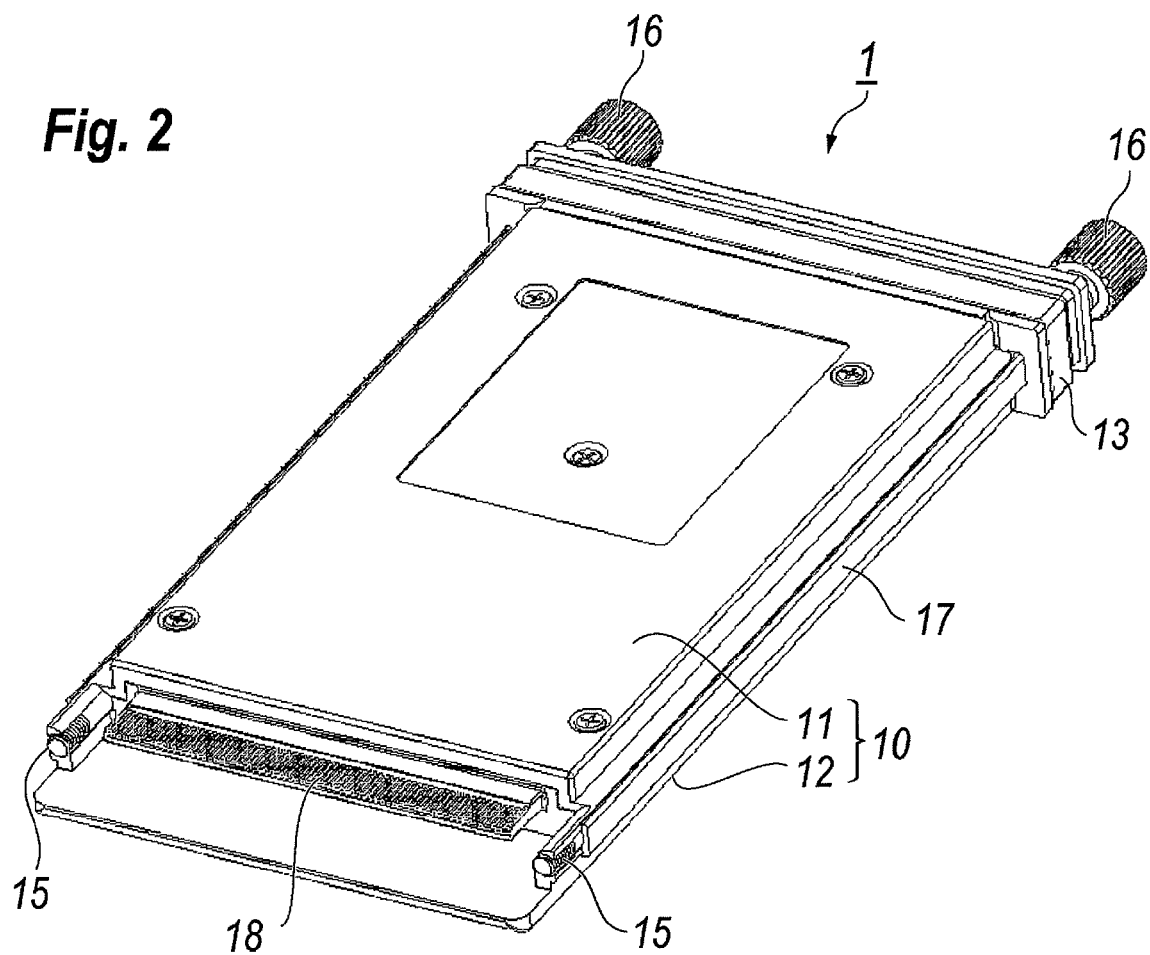
FIG. 2 is a perspective illustration of the optical transceiver viewed from the rear bottom thereof.

FIG. 1 is a perspective illustration viewed from a front top of an optical transceiver according to an embodiment of the present invention; while, FIG. 2 is also a perspective illustration of the optical transceiver viewed from the rear bottom thereof. The optical transceiver 1 shown in FIGS. 1 and 2 is a type of, what is called, the pluggable optical transceiver following the standard of the CFP. The optical transceiver 1 provides a housing 10 constituted by a bottom housing 11 and a top housing 12 to secure an inner space in which electronic and/or optical components are installed. The bottom and top housings may be made of metal such as aluminum, zinc and so on, because of the castability and the heat dissipation.

The front side 10a of the housing 10 provides a front cover 13 whose lateral center forms an opening 13a from which an optical receptacle 14 is exposed. Protruded from both sides of the front cover 13 are knobs 16 that are attached to a tip of the screws 15, respectively. This screws 15 pass the inside of the housing 10 to extrude from a rear side 10b of the housing 10. The screws 15 may fix the optical transceiver 1 with the host system which is not shown in the figures.

Both sides of the housing 10 provide ribs 17 extending from the front side 10a to the rear side 10b of the housing 10. The screws 15 may pass within the ribs 17. The ribs 17 have a function that, when the optical transceiver 1 is to be set on the host system, the ribs 17 may slide within the rail provided in the host system, which makes the insertion/extraction of the optical transceiver 1 into/from the host system in facilitated. The rear side 10b of the housing 10 extrudes an electrical plug 18 on which a plurality of electrodes to communicate with the host system electrically is formed.

Figure 3:
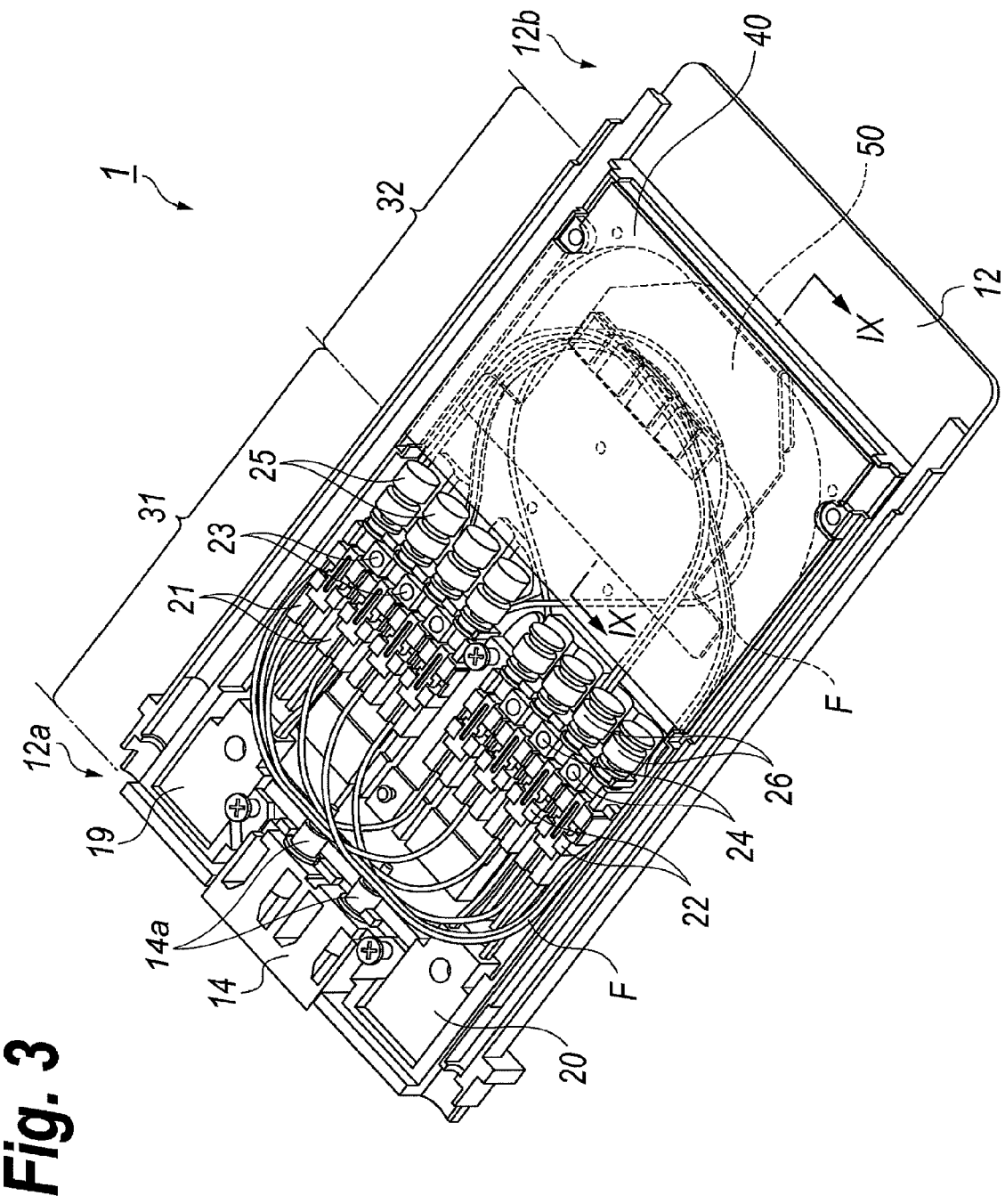
FIG. 3 shows an inside of the optical transceiver illustrated in FIGS. 1 and 2.
Figure 4:
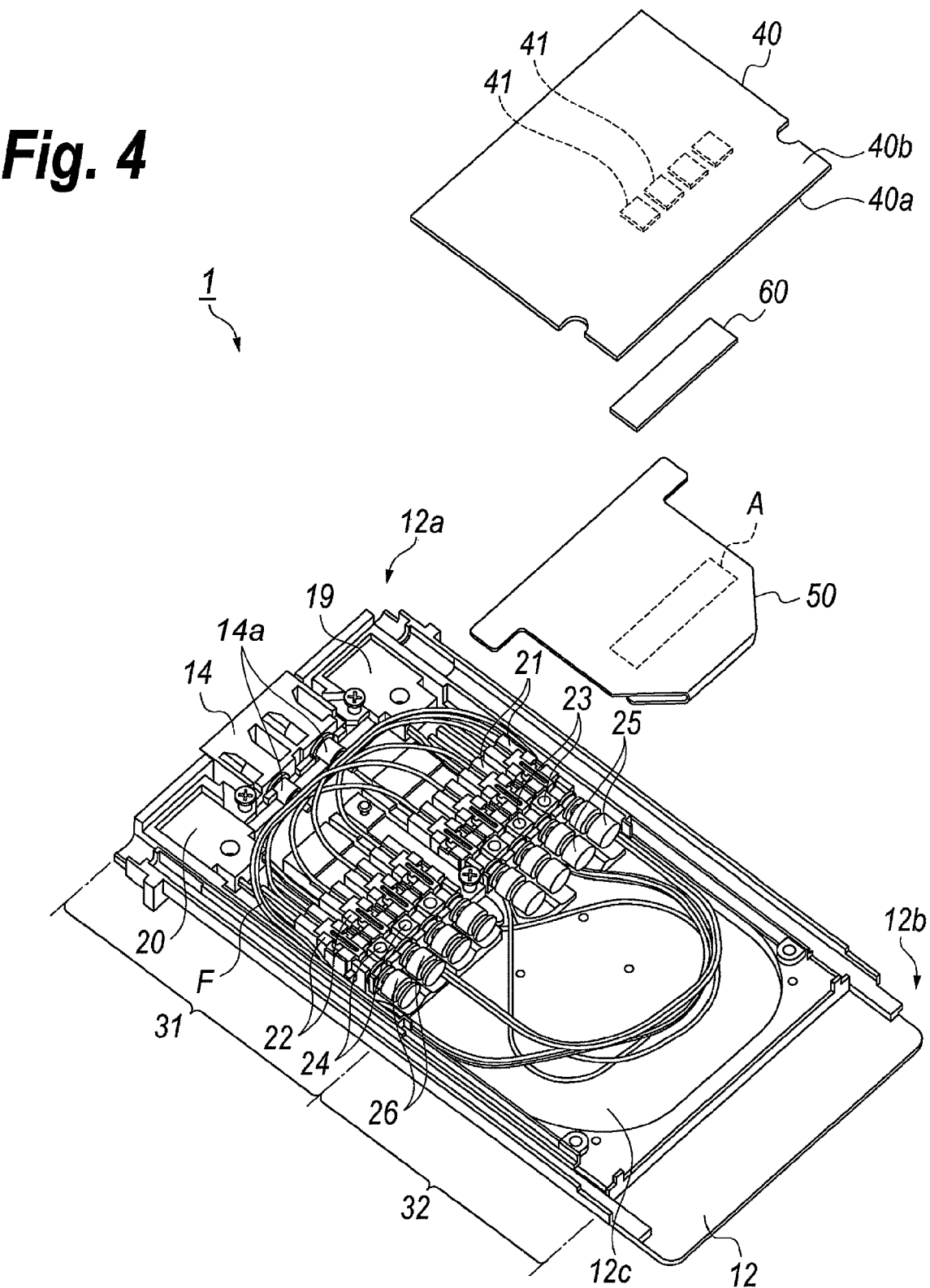
FIG. 4 is an exploded illustration of the optical transceiver shown in FIG. 3.
Figure 5:
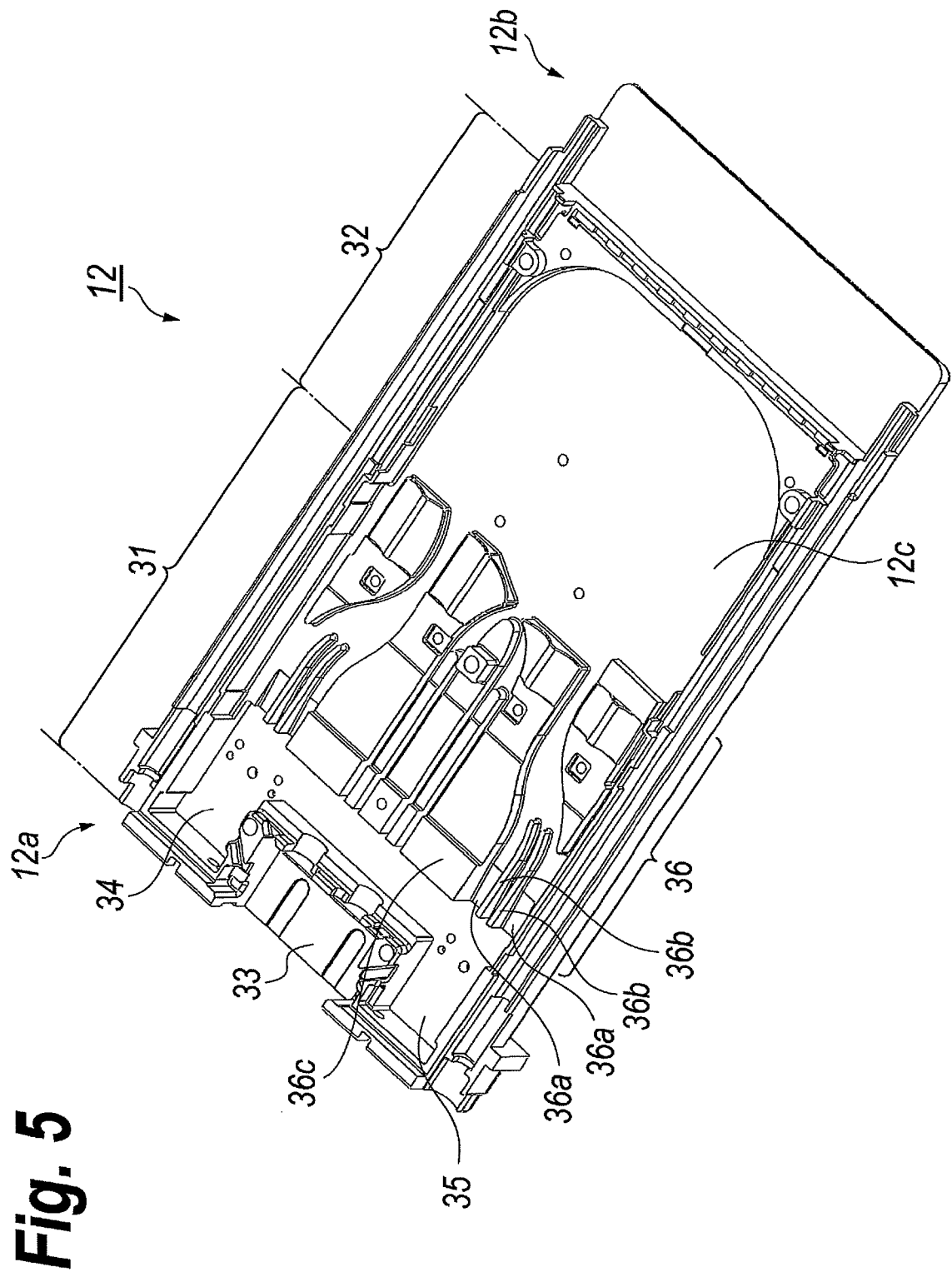
FIG. 5 shows an inside of the top housing shown in FIGS. 1 and 2.

FIG. 3 is a perspective illustration showing an inside of the optical transceiver 1 shown in FIGS. 1 and 2; FIG. 4 is an exploded illustration of the optical transceiver 1 shown in FIG. 3; while, FIG. 5 is a perspective illustration of the inside of the top housing 12. The optical transceiver 1 includes optical components such as an optical receptacle 14, an optical de-multiplexer 19, an optical multiplexer 20, two sets of inner connectors, 21 and 22, two sets of holders, 23 and 24, four receiver optical subassemblies (ROSA) 25 and four transmitter optical subassemblies (TOSA) 26; and a circuit board 40. These optical components and the circuit board 40 are installed in the inside of the top housing 12. Specifically, the top housing 12 includes a ceiling 12c virtually sectioned by the first and second sections, 31 and 32, where they are arranged from the front side 12a to the rear side 12b. The first section 31 installs the optical components; while, the second section 32 provides the circuit board 40.

The optical receptacle 14 is placed in a lateral center 33 of the first section 31. The optical receptacle 14 may receive an external optical plug, which is not shown in the figures, to transmit optical signals multiplexed by, for instance, wavelengths. The rear of the optical receptacle 14 exposes sleeves 14a from which an inner optical fiber F is pulled out. The inner fibers F, as described later in this specification, may be brought to the optical de-multiplexer 19 and the optical multiplexer 20 by wiring in the second section 32 of the top housing 12.

The optical de-multiplexer 19 is arranged in one side 34 in the first section 31. The optical de-multiplexer 19 may de-multiplex a multiplexed optical signal into a plurality of optical signals, four optical signals in the present embodiment, depending on wavelengths thereof, and transmits the de-multiplexed optical signals to respective ROSAs 25. Thus, the optical de-multiplexer 19 extends four inner fibers F therefrom.

The optical multiplexer 20 is disposed in the other side 35 in the first section 31. The optical multiplexer 20 may multiplex a plurality of optical signals, each coming from respective TOSAs 26 and having a wavelength different from others, into a single multiplexed optical signal. Accordingly, the optical multiplexer 20 extends a plurality of other inner fibers F therefrom, specifically four inner fibers in the present embodiment, to the TOSAs 26.

The inner connectors 21 are arranged next to the optical de-multiplexer 19 in an area 36, which continues to the areas, 33 to 35, in the first section 31 for the optical components, 14, 19 and 20. The optical transceiver 1 of the embodiment provides a plurality of inner connectors 21, where the present embodiment provides four inner connectors 21, arranged in an array along the lateral direction of the optical transceiver 1. The inner fibers F brought from the optical de-multiplexer 18 are coupled with respective inner connectors 21 after wired in the second section 32.

The ROSAs 25 are arranged in the area 36. Specifically, the ROSAs 25 may be secured by respective holders 23 set next to the inner connector 21. The ROSAs 25 are also arranged in an array extending laterally. Each of the inner fibers F brought from the optical de-multiplexer 19 may be optically coupled with the ROSA 25 via the inner connector 21; in other words, the ROSA 25 may couple optically with the optical de-multiplexer 19 via the inner connector 21. Then, optical signals output from the optical de-multiplexer 19 enter the respective ROSAs 25. Each of the ROSAs 25 installs an optical-to-electrical transducer, typically, a semiconductor photodiode (PD).

The other inner connectors 22 are disposed next to the optical multiplexer 20 in the area 36 behind the areas, 33 to 35, in the first section 31. The other inner connectors 22 are also arranged in an array extending laterally. Each of the inner fibers F brought from the optical multiplexer 20 couples with the corresponding inner connector 22 after being wired in the second section 32.

The TOSAs 26 are set in the area 36. Specifically, the TOSAs 26 are held by the other holder 24 placed next to the other inner connectors 22. The TOSAs 26 are also arranged in an array extending laterally within the top housing 12. Each of the inner fibers F brought from the optical multiplexer 20 is connected with the corresponding TOSA via the other inner connector 22; in other words, each of the TOSAs 26 may be optically coupled with the optical multiplexer 20 and install a light-emitting device, typically a semiconductor laser diode (LD) to convert an electrical signal into an optical signal. The optical signals provided from the TOSAs enter the optical multiplexer 20 to be multiplexed thereby.

The circuit board 40 with a rectangular plane shape is arranged in the second section 32 of the top housing 12 to cover a whole of the second section 32. The circuit board 40 includes a first surface 40a facing the top housing 12 and another surface 40b facing the bottom housing 11. The circuit board 40 mounts electronic circuits thereon, such as clock data recoveries (CDR) for the ROSAs 25, drivers (DRV) for the TOSAs 26, and so on. These circuits may be integrated within an integrated circuit (IC) 41 mounted on the first surface 40a in the present embodiment.

The circuit board 40 may be disposed in vertically offset from the vertical center of the housing 10 according to the standard of the optical transceiver 1. Specifically, the circuit board 40 makes a space against the top housing 12 greater than a space against the bottom housing 11. Therefore, the optical transceiver 1 of the present embodiment may wire the inner fibers F between the circuit board 40 and the top housing 12.

As described above, the optical transceiver 1 installs a plurality of inner fibers, ten inner fibers F in the present embodiment, within the housing 10. These inner fibers F return to the first section 31 after being guided in the second section 32. The first section 31 in the rear area 36 thereof provides a plurality of grooves 36a to guide the inner fibers F therein. Specifically, the rear area 36 of the first section 31 provides a plurality of terraces 36c on which the inner connectors, 21 and 22, the holders, 23 and 24, the ROSAs 25 and the TOSAs 26 are placed. The banks 36b and the terraces 36c may form the grooves 36a.

The grooves 36a longitudinally extend from the front side 12a to the rear side 12b of the top housing 12, namely, from the first section 31 to the second section 32. The inner fibers F may be guided within the groove 36a from the first section 31 to the second section 32; thereafter, they are rounded toward the first section 31 between the circuit board 40 and the top housing 12 in the second section 32.

Figure 6:
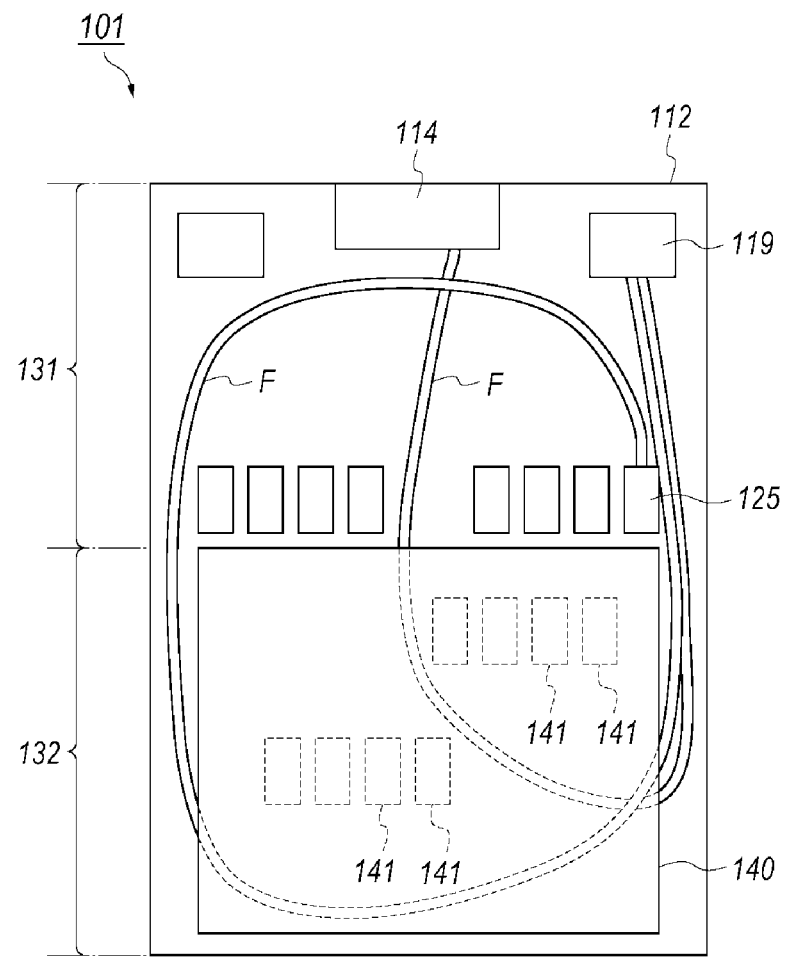
FIG. 6 schematically illustrates the inside of a conventional optical transceiver.

FIG. 6 is a plan view schematically showing an arrangement of the inner fibers F in a conventional optical transceiver 101. In the optical transceiver 101, the inner fiber F pulled out from the optical receptacle 114 reaches the optical de-multiplexer 119 after being guided in the first section 131, and rounded in the second section 132. Another inner fiber F drawn out from the optical de-multiplexer 119 is guided in one side of the first section 131, rounded in the second section 132, guided in the other side in the first section 131, rounded again in the first section 131, and finally coupled with one of the ROSAs 125. A space secured between the circuit board 140 and the top housing 112 is provided for the wiring of the inner fibers F.

Figure 7:
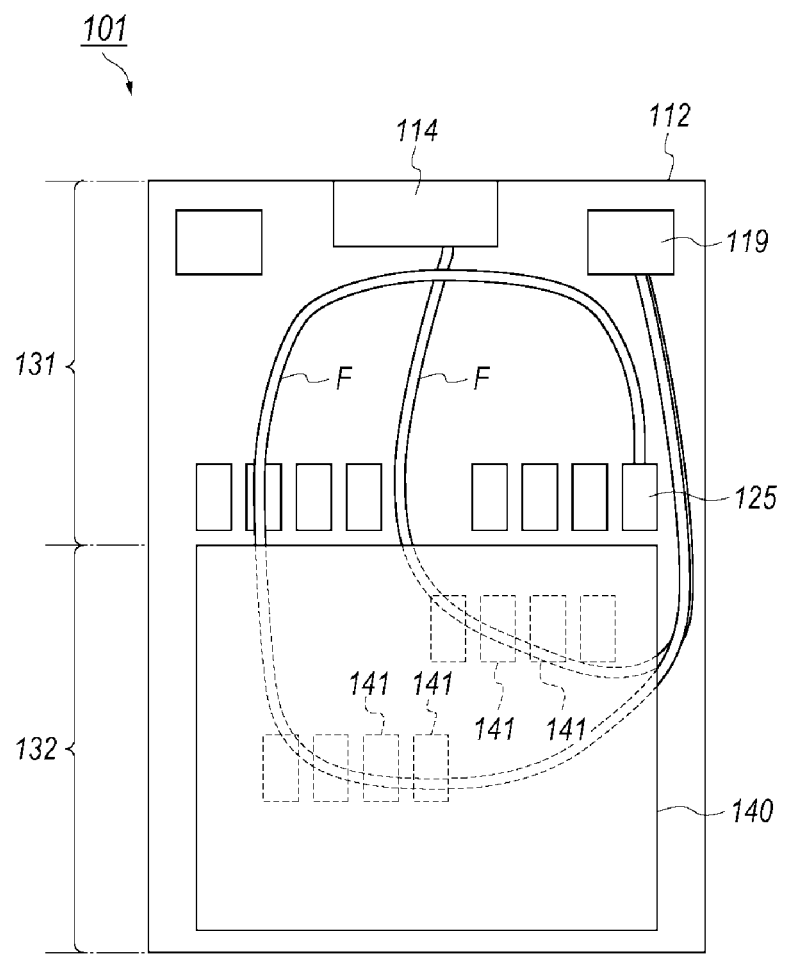
FIG. 7 schematically illustrates the inside of the conventional optical transceiver, where one of inner fibers interferes a heat dissipating path due to insufficient length thereof.

The optical transceiver 101 shown in FIG. 7 arranges the inner fiber F on the path to dissipate heat, which exists just under the active electronic component 141, typically an integrated circuit IC. This arrangement not only degrades the efficiency to dissipate heat from the IC 141 but increases the possibility to cause failures in the inner fiber F. The IC 141, taking the high frequency performance thereof into account, is hard to change the position thereof. Accordingly, the inner fiber F in the conventional optical transceiver 101 is inevitable to be wired to detour the position beneath the IC 141. On the other hand, components assembled with the inner fiber F such as the optical de-multiplexer 119, when the wired space thereof is limited as described above and the inner fiber F is unable to be wired in those limited space due to an insufficient length as shown in FIG. 7, is unavoidable to be replaced. Thus, the heat dissipating path without disturbing the wiring of the inner fiber F is requested in an optical transceiver.

The optical transceiver 1 of an embodiment of the invention further provides a tray 50 to solve the subject above described. As shown in FIGS. 3 and 4, the tray 50 of the present embodiment is set in the second section 32 of the top housing 12. Specifically, the tray 50, which may be formed by metal plate made of copper (Cu), aluminum (Al) alloy and so on, is put between the top housing 12 and the circuit board 40 in the second section 32.

Figure 8A:
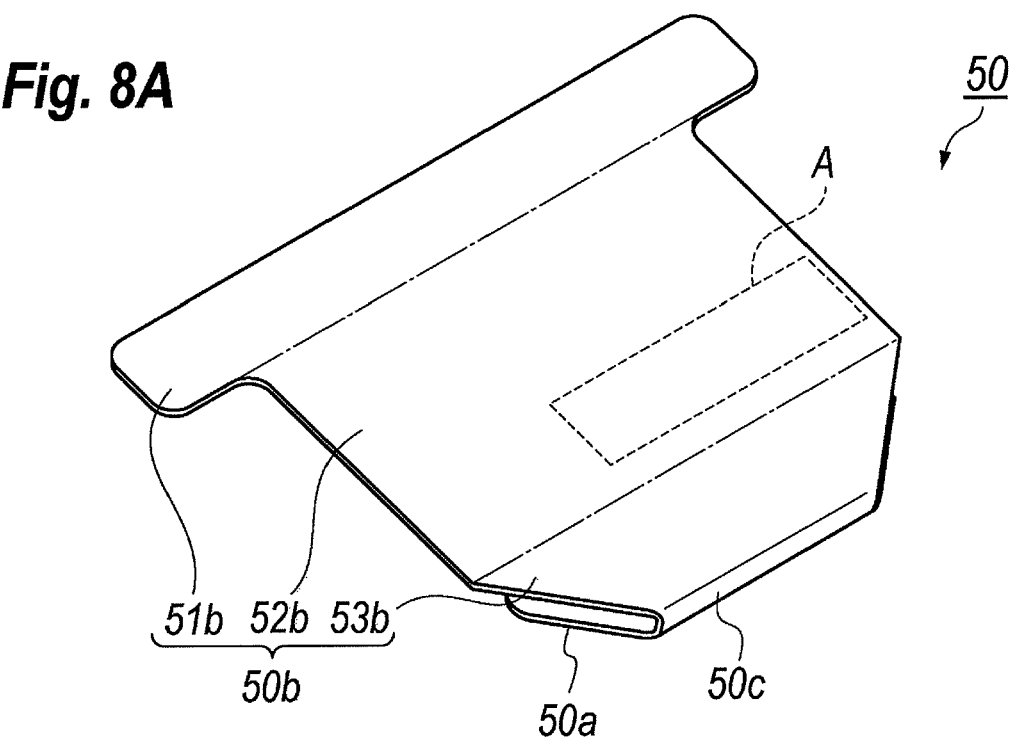
FIG. 8A is a perspective illustration of a tray viewed from the top thereof.
Figure 8B:
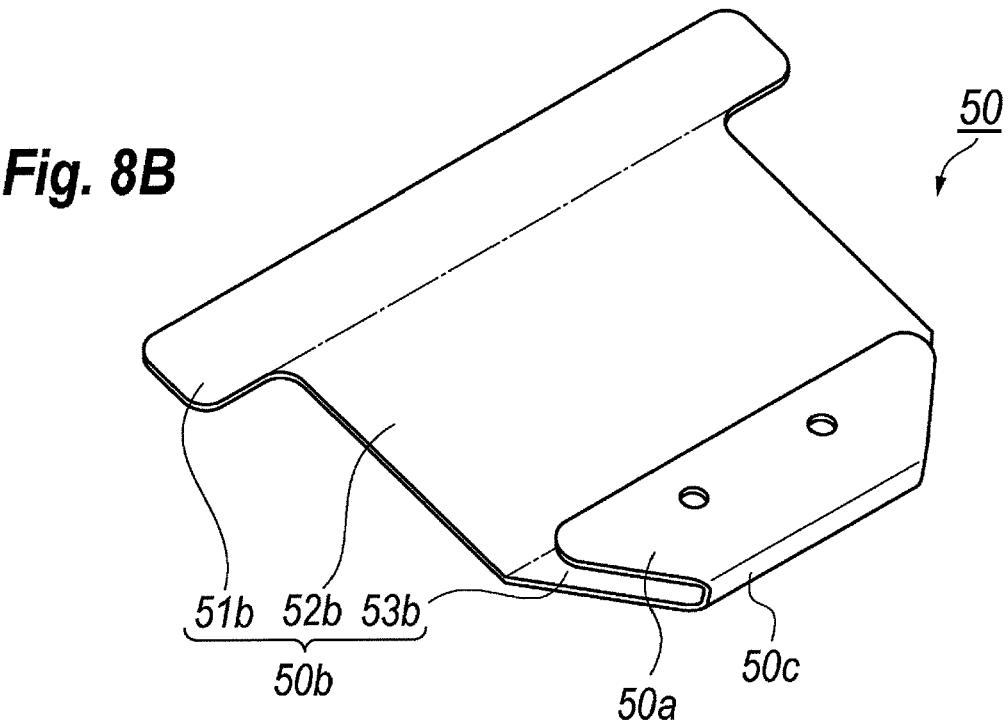
FIG. 8B is a perspective illustration of the tray viewed from the bottom thereof.
Figure 9:
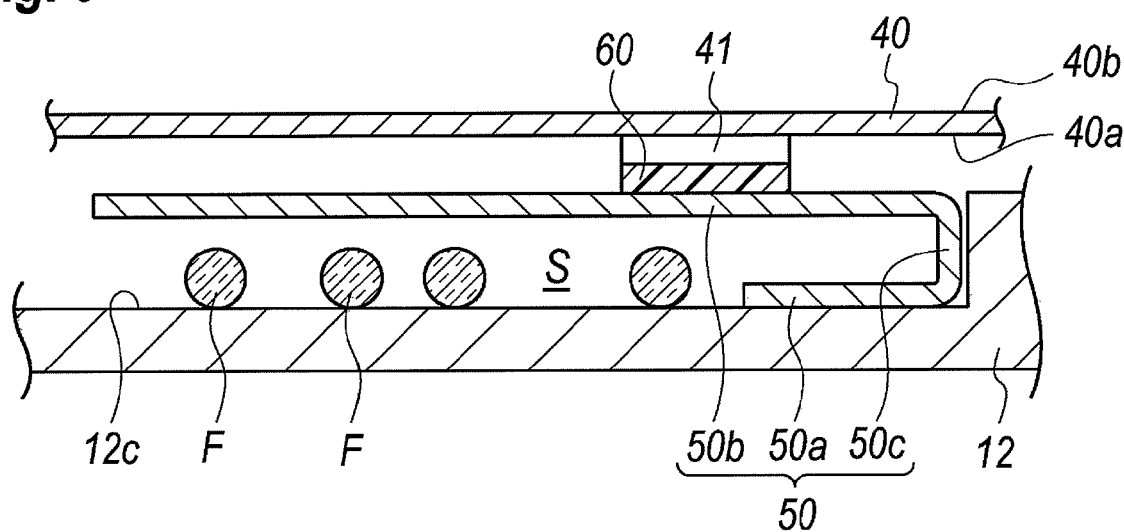
FIG. 9 is a cross section of the optical transceiver taken along the line IX-IX appeared in FIG. 3.

FIG. 8 is a perspective illustration of the tray 50 shown in FIGS. 3 and 4, while, FIG. 9 shows a cross section of the optical transceiver taken along the IX-IX indicated in FIG. 3. As shown in those figures, the tray 50 includes a contact plane 50a to be in contact with the top housing 12, a primary plane 50b to be in contact with the electronic components 41, and a turn 50c connecting the contact plane 50a with the primary plane 50b. Thus, the tray 50 has a U-shaped cross section. The tray 50 thus described may be formed only by cutting and bending a metal plate without soldering, welding, and so on.

The contact plane 50a may extend substantially in parallel with the ceiling 12c of the top housing 12, and comes in contact thereto. The plane shape of the contact plane 50a is a trapezoid with an upper base thereof continuous to the turn 50c. The tray 50 may be fixed to the top housing 12 by, for instance, a screw as the contact plane 50a thereof is in contact with the ceiling 12c.

The primary plane 50b, which is apart from the ceiling 12c, extends substantially in parallel to and faces the circuit board 40. The primary plane 50b includes first to third portions, 51b to 53b, arranged longitudinally in this order from the front side 12a to the rear side 12b. The first portion 51b has a rectangular plane shape with a long side thereof extending laterally from one side to the other of the top housing 12. The first portion 51b of the primary plane 50b is arranged in the front end of the second section 32.

The second portion 52b also has a rectangular plane shape with a long side thereof shorter than the long side of the first portion 51b. The second portion 52b is arranged in a lateral center of first portion, that is, the first and second portions, 51b and 52b, have a center common to each other. The second portion 52b includes an area A facing the IC 41. The third portion 53b has a trapezoid substantially same as that of the contact plane 50a. The third portion 53b is connected to the second portion 52b in the lower base thereof, while, to the contact plane 50c in the upper base thereof. Thus, the turn 50c connects the contact plane 50a with the primary plane 50b, and arranged in the rear end of the second section 32.

The primary plane 50b thus configured is apart from the ceiling 12c by the contact plane 50a, but extends substantially in parallel to the ceiling 12c, which may secure a space S between the ceiling 12c of the top housing 12 and the primary plane 50b in the second section 32. In particular, the space S includes a portion between the ceiling 12c and the IC 41, namely, a portion immediately below the IC 41 because the primary plane 50b includes the area A facing the IC 41. Thus, the tray 50 may secure a wide wiring space S independent of the position of the IC 41.

The embodiment shown in the figures arranges a thermal sheet 60 between the area A and the IC 41 to be in contact therewith. Accordingly, the thermal sheet 60 may couple the tray 50 thermally with the IC 41 in the area A. Moreover, the tray 50 in the contact plane 50a thereof may be directly contact with the ceiling 12c, which means that the tray 50 may be thermally in contact with the top housing 12. Thus, the tray 50 may show a function of a heat dissipating path from the IC 41 to the top housing 12. The thermal sheet 60 may be made of resin such as silicone, acryl, and so on containing with metal fillers with good thermal conductivity.

The optical transceiver 1 of the present embodiment provides the tray 50 with the primary plane 50b physically apart from the ceiling 12c and extending along the circuit board 40. Moreover, the primary plane 50b includes the area A facing the IC 41. The space S within which the inner fibers F are wired in the second section 32 may be secured between the primary plane 50b and the ceiling 12c. In other words, the tray 50 may provide a wiring space S for the inner fiber F even in a portion beneath the IC 41, which means that the wiring space S for the inner fibers F is independent of the position of the IC 41. Moreover, the tray 50 may secure the heat dissipating path from the IC 41 to the top housing 12. Accordingly, the optical transceiver 1 of the present embodiment may dissipate heat effectively without limiting the space for wiring the inner fibers F.

Thus, an exemplary embodiment of an optical transceiver is described. In the foregoing description, an optical transceiver according to the present invention has been described with reference to specific exemplary embodiment thereof. However, it will be evident that various modifications and changes may be made thereto without departing from the broader spirit and scope of the present invention.

Figure 10:
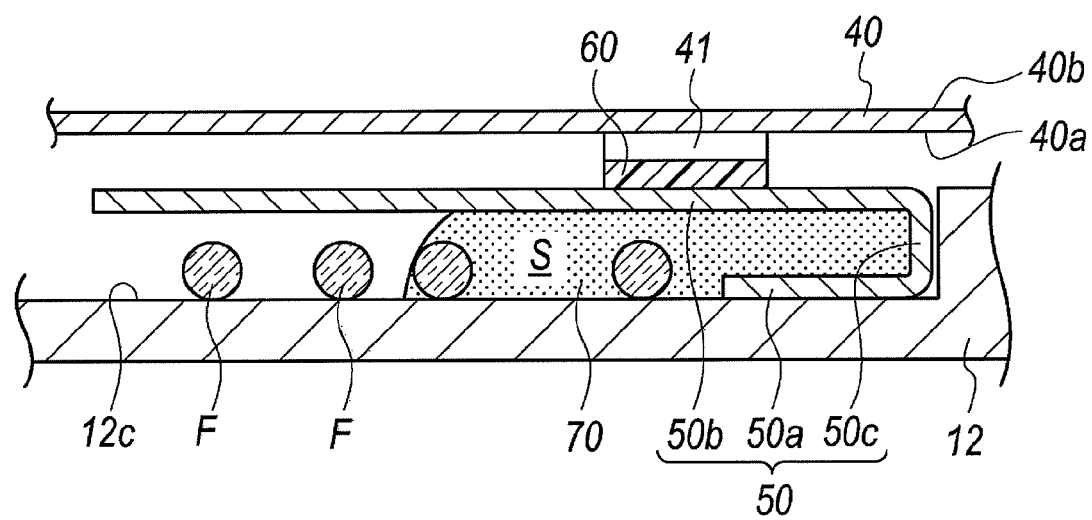
FIG. 10 is a cross section of the optical transceiver according to a modified embodiment of the invention.

For instance, the space S for wiring the inner fibers F formed between the tray 50 and the ceiling 12c may be filled with a thermal gel 70 as shown in FIG. 10. The thermal gel 70 may be filled in the whole of the space S, or only in a portion beneath the IC 41. The thermal gel 70 may reduce thermal resistance of the path from the IC 41 to the top housing 12 via the tray 50. The thermal gel 50 may be made of silicone, acrylic, and so on containing metal fillers with good thermal conductivity.

Figure 11A:
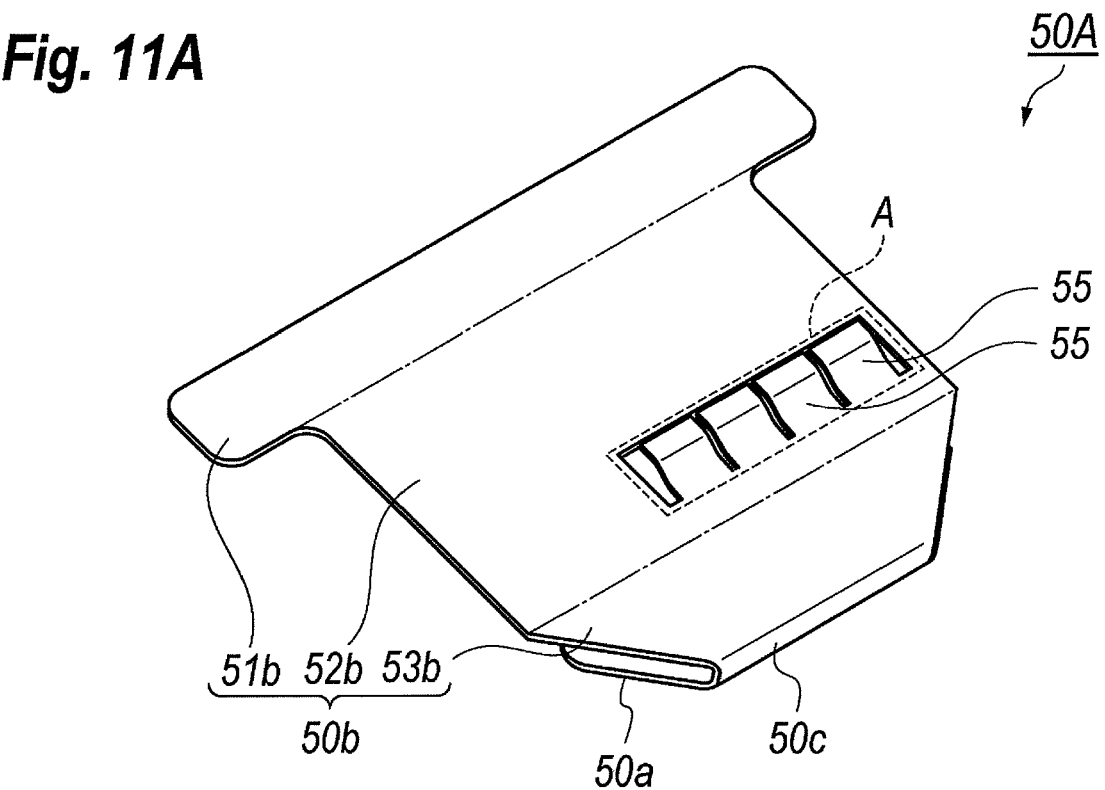
FIG. 11A is a perspective illustration of another tray viewed from the top.
Figure 11B:
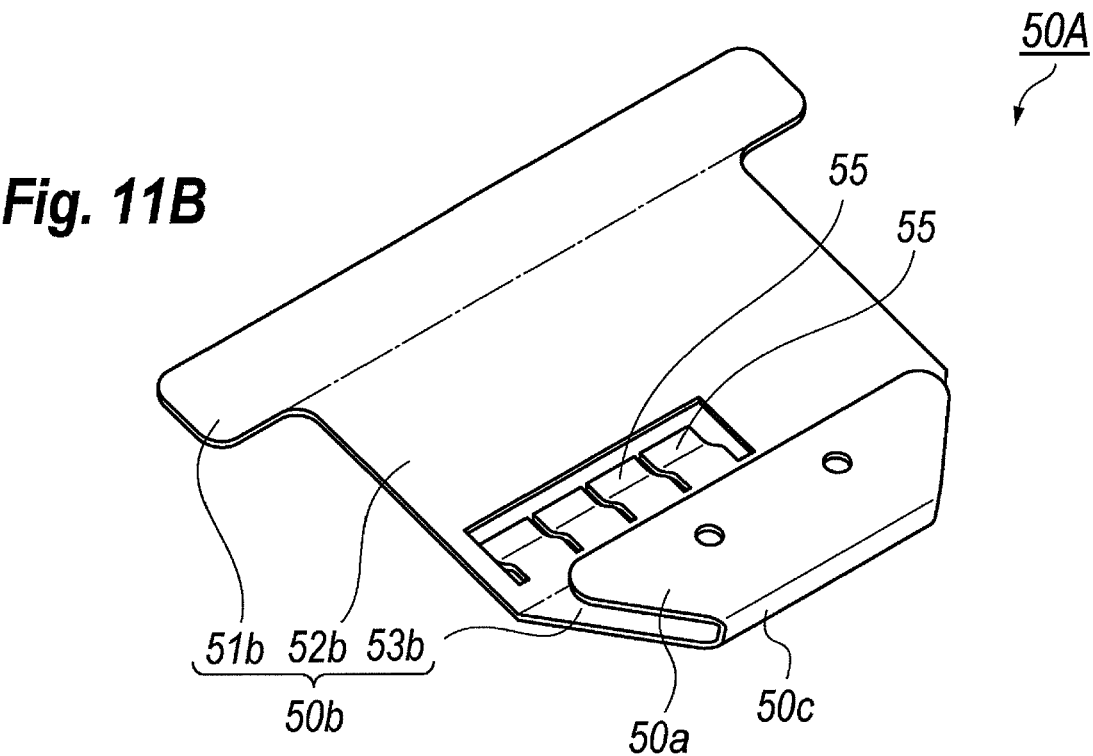
FIG. 11B is a perspective illustration thereof viewed from the bottom.

In another modification, the optical transceiver 1 may implement with another tray 50A shown in FIG. 11. This tray 50A includes a plurality of fins 55 in the area A facing the IC 41. Other arrangements of the tray 50A are similar to or substantially same with those of the aforementioned tray 50. The fins 51 may be formed by cutting the area A of the primary plane 50b in the U-shape and pulling the U-shaped fingers upward, toward the IC 41. The fins 51 may securely come in contact with the IC 41 by the elasticity thereof, and reduce the thermal resistance against the IC 41. The modified tray 50A may accompany therewith the thermal sheet 60 and/or the thermal gel 70.

The tray 50, or the modified tray 50A, may be directly come in contact with the IC 41 without putting the thermal sheet 60 therebetween. The tray 50, or the modified tray 50A, inherently has elasticity because it is formed by cutting a metal plate and bending the cut metal plate. Setting the tray, 50 or 50A, as the primary plane 50b is apart from the contact plane 50a; or the turn 50c has a curvature to extend both planes, 50a and 50b, not in parallel, the tray, 50 or 50A, may show sufficient elasticity when both planes come in contact with respective members.

In still another modification, the tray, 50 or 50A, may be discretely formed with the top housing 12 as aforementioned embodiments, or may be integrally formed therewith. Moreover, the tray, 50 or 50A, may be applicable not only to an optical transceiver but other general equipments that implement with inner fibers, such as optical amplifiers, optical modems, and so on.

Figure 12:
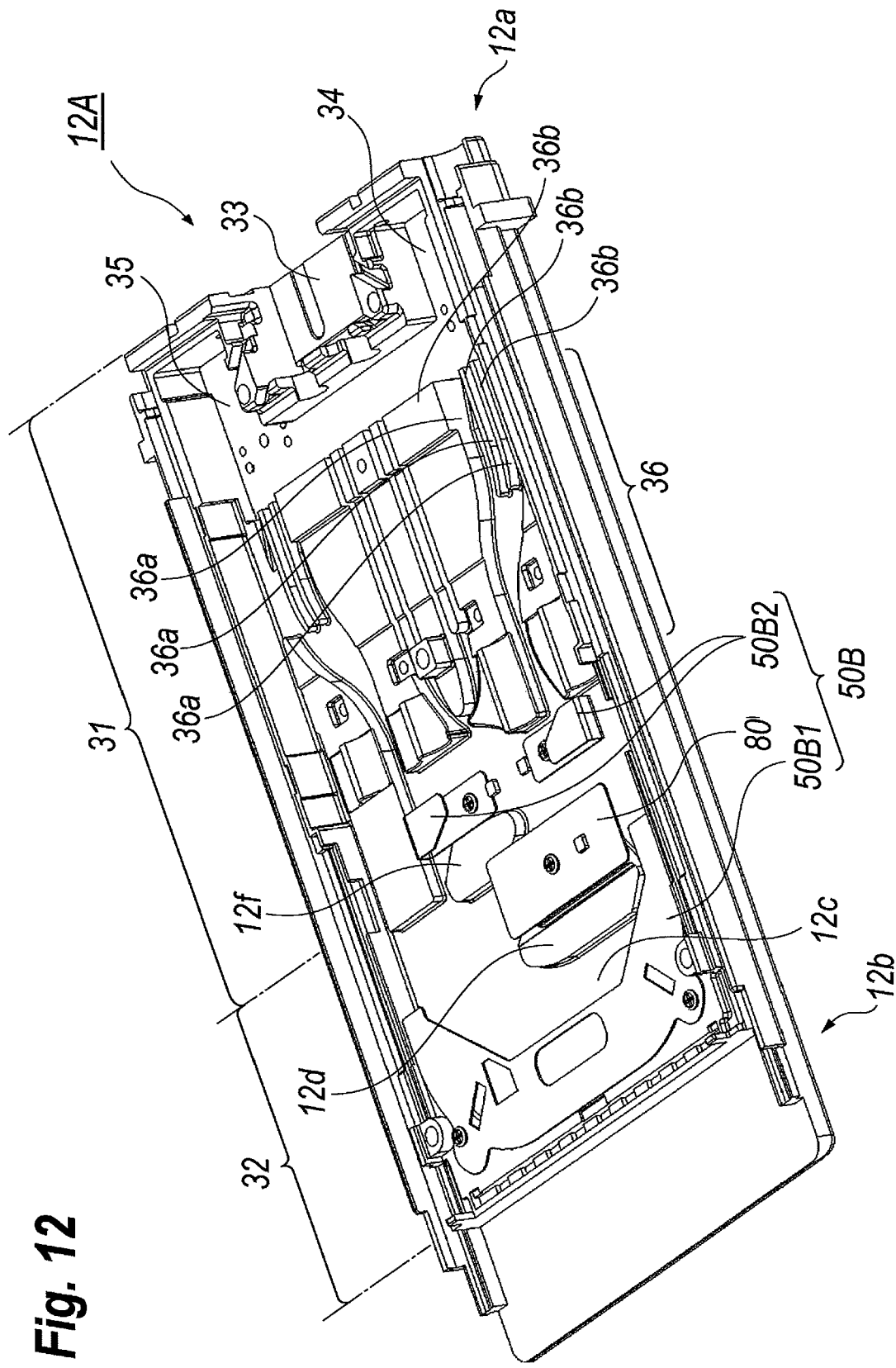
FIG. 12 shows an inside of the top housing according to still another embodiment of the invention.
Figure 13:
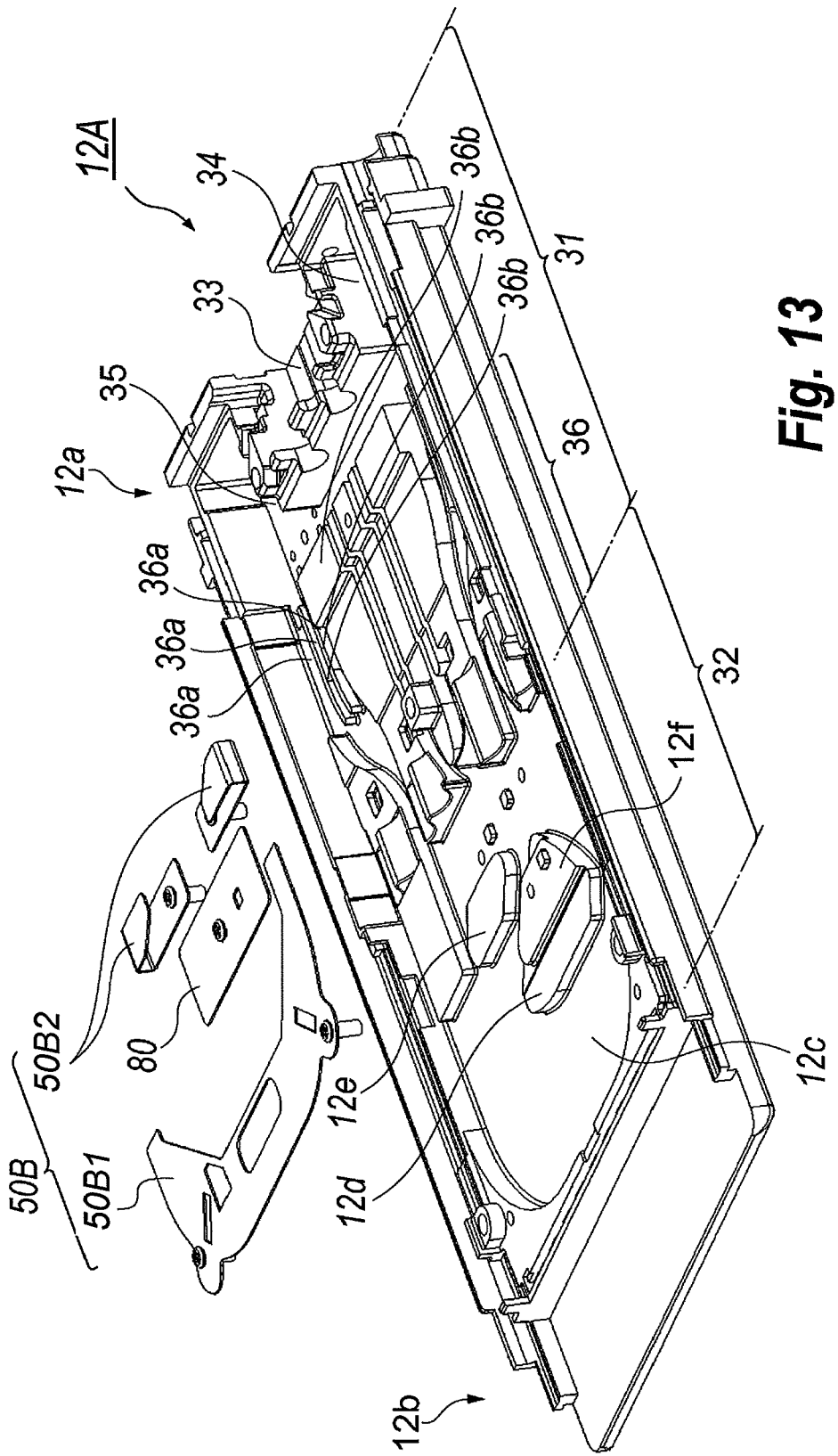
FIG. 13 is an exploded illustration of the tray and the top housing shown in FIG. 12.

FIGS. 12 and 13 show further modified embodiment of an optical transceiver according to the present invention, where FIG. 12 is a perspective view of the top housing 12A, while, FIG. 13 is an exploded view thereof. As shown in FIGS. 12 and 13, the modified transceiver is distinguishable from the aforementioned optical transceiver 1 in points that the optical transceiver includes the modified top housing 12A instead of the aforementioned top housing 12, a modified tray 50B instead of the tray 50, and further includes an extra plate 80.

The top housing 12A has terraces, 12d and 12e, in the second section 32 thereof. These terraces, 12d and 12e, face a circuit of the clock recovery for the ROSAs 25 and another circuit of the driver for the TOSAs 26. Thus, the terraces, 12d and 12e, secure heat dissipating paths from those ICs to the top housing 12A. One of the terraces 12d further provides a supplemental terrace 12f thereon. The supplemental terrace 12f mounts the extra plate 80 with a rectangular plane shape. Thus, the extra plate 80, the terrace 12f and another terrace 12d may secure the heat dissipating paths from the electronic components on the circuit board 40 to the top housing 12A.

The tray 50B is put between the ceiling 12c and the circuit board 40 as those of the aforementioned embodiment. The tray 50B in the second section 32 thereof may guide the inner fibers F drawn from the first section 31. The tray 50B of the present embodiment may be divided into two parts, 50B1 and 50B2, one of which 50B1 covers a rear portion of the ceiling 12c, while the other 50B2 is further divided into two parts each of which has a contact plane, a primary plane and a turn as those of the aforementioned tray, 50 or 50A.

Specifically, the tray 50B1 has a C-shaped plane to cover the rear portion of the ceiling 12c as being apart therefrom. Accordingly, the tray 50B1 may secure a space for wiring the inner fibers F in whole rear portion of the ceiling 12c. The other trays 50B2 are set to face to each other in the front portion of the second section 32. The trays 50B2 have the U-shaped cross section as those of the aforementioned trays, 50 and 50A, to prevent the inner fibers F from slipping out therefrom.

Thus, the tray 50B according to the present embodiment may prevent the inner fibers F from slipping out or being in confusion in the second section 32. Discrete trays, 50B1 and 50B2, may be formed easily compared with the integrated trays, 50 or 50A.

What is claimed is:
1. An optical transceiver, comprising:
 an optical subassembly;
 an optical component optically coupled with the optical subassembly by an inner fiber;
 an electrical component mounted on a circuit board, the electrical component generating heat;
 a tray for guiding the inner fiber; and a housing for enclosing the optical subassembly, the optical component, the electrical component and the tray therein,
wherein the tray comes in contact with the electrical component and the housing to secure a heat dissipating path from the electrical component to the housing.

2. The optical transceiver of claim 1,
wherein the tray comes in indirectly contact with the electrical component via a thermal sheet.

3. The optical transceiver of claim 1,
wherein the tray has a primary plane being in contact with the electrical component but apart from the housing, a contact plane being in contact with the housing, and a turn connecting the primary plane with the contact plane,
wherein the primary plane, the turn and the contact plane form a U-shaped cross section with a space surrounded by the primary plane, the turn, the contact plane, and the housing in which the inner fiber is secured.

4. The optical transceiver of claim 3,
wherein the space is filled with a thermal gel.

5. The optical transceiver of claim 3,
wherein the primary plane has a fin elastically coming in contact with the electrical component.

6. The optical transceiver of claim 1,
wherein the housing has a terrace coming in contact with the electrical component.

7. The optical transceiver of claim 6,
wherein the terrace mounts an extra plate thereof, the terrace being in indirectly contact with the electrical component via the extra plate.

8. A pluggable optical transceiver capable of receiving a wavelength multiplexed optical signal and transmitting another wavelength multiplexed optical signal, comprising:
a housing including a first section and a second section;
a plurality of receiver optical subassemblies (ROSA) and a plurality of transmitter optical subassemblies (TOSA), the ROSAs and the TOSAs being mounted on the first section of the housing;
an optical multiplexer and an optical de-multiplexer each mounted on the first section of the housing;
an electronic circuit electrically coupled with the ROSAs and the TOSAs, the electronic circuit being mounted on the second section of the housing;
a plurality of inner fibers, a part of which connects the optical de-multiplexer with the ROSAs and another part of which connects the optical multiplexer with the TOSAs, the inner fibers being drawn from the first section and bent; and
a tray for guiding the inner fibers in the second section,
wherein the tray provides a heat dissipating path from the electronic circuit to the housing.

9. The pluggable optical transceiver of claim 8,
wherein the tray is made of metal and has a U-shape cross section with a primary plane and a contact plane each corresponding to respective bars of the U-shape and a turn corresponding to a bottom of the U-shape, the primary plane being in contact with the electronic circuit, the contact plane being in contact with the housing.

10. The pluggable optical transceiver of claim 9,
wherein the primary plane of the tray is elastically in contact with the electronic circuit, and the contact plane is elastically in contact with the housing.

11. The pluggable optical transceiver of claim 9,
wherein the primary plane of the tray is indirectly in contact with the electronic circuit via a thermal sheet.

12. The pluggable optical transceiver of claim 9,
wherein the primary plane is apart from the housing to secure a space surrounded by the primary plane, the turn, the contact plane, and the housing, and
wherein the inner fibers are secured in the space.

13. The pluggable optical transceiver of claim 12,
wherein the space is filled with a thermal gel.

14. The pluggable optical transceiver of claim 13,
wherein the thermal gel includes a silicone or acrylic containing metal fillers.

\* \* \* \* \*